(12) United States Patent
Wang et al.

(10) Patent No.: US 11,281,343 B2
(45) Date of Patent: Mar. 22, 2022

(54) TOUCH PANEL, MANUFACTURING METHOD THEREOF AND CORRESPONDING TOUCH DEVICE

(71) Applicants: HEFEI XINSHENG OPTOELECTRONICS TECHNOLOGY CO., LTD., Anhui (CN); BOE TECHNOLOGY GROUP CO., LTD., Beijing (CN)

(72) Inventors: Jing Wang, Beijing (CN); Lingyan Wu, Beijing (CN); Taofeng Xie, Beijing (CN); Min He, Beijing (CN); Xiaodong Xie, Beijing (CN); Qitao Zheng, Beijing (CN); Jian Tian, Beijing (CN); Wei Zhang, Beijing (CN); Qin Zeng, Beijing (CN); Xiao Han, Beijing (CN); Qidi Wu, Beijing (CN); Dong Li, Beijing (CN)

(73) Assignees: HEFEI XINSHENG OPTOELECTRONICS TECHNOLOGY CO., LTD., Anhui (CN); BOE TECHNOLOGY GROUP CO., LTD., Beijing (CN)

( * ) Notice: Subject to any disclaimer, the term of this patent is extended or adjusted under 35 U.S.C. 154(b) by 620 days.

(21) Appl. No.: 16/326,773

(22) PCT Filed: Aug. 9, 2018

(86) PCT No.: PCT/CN2018/099508
§ 371 (c)(1),
(2) Date: Feb. 20, 2019

(87) PCT Pub. No.: WO2019/076106
PCT Pub. Date: Apr. 25, 2019

(65) Prior Publication Data
US 2021/0382582 A1 Dec. 9, 2021

(30) Foreign Application Priority Data

Oct. 18, 2017 (CN) .......................... 201710970970.8

(51) Int. Cl.
*G06F 3/044* (2006.01)
(52) U.S. Cl.
CPC .. *G06F 3/0446* (2019.05); *G06F 2203/04103* (2013.01); *G06F 2203/04111* (2013.01); *G06F 2203/04112* (2013.01)
(58) Field of Classification Search
CPC combination set(s) only.
See application file for complete search history.

(56) References Cited

U.S. PATENT DOCUMENTS

2018/0164916 A1* 6/2018 Seo .................. G06F 3/0443
2019/0155436 A1* 5/2019 Jin .................... G02F 1/134309

FOREIGN PATENT DOCUMENTS

CN 105912167 A 8/2016
CN 205750184 U 11/2016
(Continued)

OTHER PUBLICATIONS

Search Report and Written Opinion for International Application No. PCT/CN2018/099508 dated Nov. 8, 2018.
(Continued)

*Primary Examiner* — Deeprose Subedi
(74) *Attorney, Agent, or Firm* — Calfee, Halter & Griswold LLP (57) ABSTRACT

A touch panel, a manufacturing method thereof, and a corresponding touch device. The touch panel comprises: a substrate; a first, pattern metal layer on the substrate, wherein the first metal layer has a plurality of first touch electrode regions and a plurality of wiring regions between adjacent first touch electrode regions; an insulating layer overlaying the first metal layer; and a second metal layer on
(Continued)

the insulating layer. The second metal layer has a plurality of second touch electrode regions. An orthogonal projection of each second touch electrode region on the substrate overlaps an orthogonal projection of a wiring region on the substrate.

20 Claims, 6 Drawing Sheets

(56) References Cited

FOREIGN PATENT DOCUMENTS

| | | |
|---|---|---|
| CN | 107765917 A | 3/2018 |
| JP | 5780455 B2 | 9/2015 |

OTHER PUBLICATIONS

First Office Action for Chinese Patent Application No. 201710970970.8 dated May 21, 2019.

* cited by examiner

TOUCH PANEL, MANUFACTURING METHOD THEREOF AND CORRESPONDING TOUCH DEVICE

RELATED APPLICATIONS

The present application is the U.S. national phase entry of PCT/CN2018/099508 filed on Aug. 9, 2018, which claims the priority of the Chinese patent application No. 201710970970.8 filed on Oct. 18, 2017, of which the entire disclosure of both are incorporated herein by reference.

TECHNICAL FIELD

This disclosure relates to the field of touch control technologies, and in particular to a touch panel, a manufacturing method thereof, and a corresponding touch device.

BACKGROUND ART

Touch control technologies have been more and more popular since their rise. According to different sensing manners, touch screens can be generally divided into add-on touch screens and built-in touch screens. An add-on touch screen can mainly be divided into a G+G type, a GFF type, an OGS type and an On-cell type. Specifically, in an On-cell touch screen, the touch screen is embedded between a color filter substrate and a polarizer of the display screen, i.e., the touch sensor is configured on a liquid crystal panel. In contrast, in a built-in touch screen, touch devices are integrated between a color filter substrate and an array substrate, so the built-in touch screen is also called an In-cell touch screen. Both On-cell touch screens and In-cell touch screens are advancing towards a large size. Therefore, in order to accommodate a larger screen with a limited device size and increase the screen-to-body ratio, reducing the border width has become the mainstream design direction of current flexible products. To this end, producers of touch screens have introduced borderless product designs one after another.

SUMMARY

According to one exemplary embodiment of the present disclosure, a touch panel is provided. The touch panel comprises: a substrate; a first, patterned metal layer on the substrate, wherein the first metal layer comprises a plurality of first touch electrode regions and a plurality of wiring regions between adjacent first touch electrode regions; an insulating layer overlaying the first metal layer; and a second metal layer on the insulating layer, wherein the second metal layer comprises a plurality of second touch electrode regions, and an orthogonal projection of each second touch electrode region on the substrate overlaps an orthogonal projection of a wiring region on the substrate.

According to a specific implementation, in the touch panel provided by an embodiment of the present disclosure, at least one of the plurality of wiring regions comprises a plurality of wirings and a plurality of bridge points between adjacent wirings; the insulating layer comprises a plurality of via holes, an orthogonal projection of each via hole on the substrate overlapping an orthogonal projection of a bridge point on the substrate; and each of the second touch electrode regions comprises driving electrodes and sensing electrodes arranged to intersect each other, wherein the driving electrodes or the sensing electrodes are bridged with a corresponding bridge point via one or more via holes at an intersection.

According to a specific implementation, in the touch panel provided by an embodiment of the present disclosure, the wirings comprise a signal wiring and a redundant wiring.

According to a specific implementation, in the touch panel provided by an embodiment of the present disclosure, the signal wiring and the redundant wiring have a line width of 4-6 μm.

According to a specific implementation, in the touch panel provided by an embodiment of the present disclosure, the first metal layer and the second metal layer are designed to have a metal mesh structure.

According to a specific implementation, in the touch panel provided by an embodiment of the present disclosure, the first metal layer and the second metal layer are made of a flexible metal.

According to a specific implementation, in the touch panel provided by an embodiment of the present disclosure, the first metal layer and the second metal layer are made of silver or a silver alloy.

According to another exemplary embodiment of the present disclosure, a touch device is further provided. The touch device comprises the touch panel described in any of the above embodiments.

According to yet another exemplary embodiment of the present disclosure, a manufacturing method for a touch panel is further provided. The manufacturing method comprises steps of: providing a substrate; forming a first, patterned metal layer on the substrate, wherein the first metal layer comprises a plurality of first touch electrode regions and a plurality of wiring regions between adjacent first touch electrode regions; overlaying the first metal layer with an insulating layer; and forming a second metal layer on the insulating layer, wherein the second metal layer comprises a plurality of second touch electrode regions, and an orthogonal projection of each second touch electrode region on the substrate overlaps an orthogonal projection of a wiring region on the substrate.

According to a specific implementation, the manufacturing method for a touch panel provided by an embodiment of the present disclosure further comprises steps of: forming a plurality of wirings and a plurality of bridge points between adjacent wirings in at least one of the plurality of wiring regions; forming a plurality of via holes in the insulating layer, such that an orthogonal projection of each via hole on the substrate overlapping an orthogonal projection of a bridge point on the substrate; and forming driving electrodes and sensing electrodes to intersect each other in each of the second touch electrode regions, such that the driving electrodes or the sensing electrodes are bridged with a corresponding bridge point via one or more via holes at an intersection.

According to a specific implementation, in the manufacturing method for a touch panel provided by an embodiment of the present disclosure, the wirings comprise a signal wiring and a redundant wiring, and the signal wiring and the redundant wiring have a line width of 4-6 μm.

According to a specific implementation, in the manufacturing method for a touch panel provided by an embodiment of the present disclosure, the step of forming a second metal layer on the insulating layer comprises sub-steps of: depositing a second metal film on the insulating layer; and processing the second metal film by a patterning process to form the second metal layer.

According to a specific implementation, in the manufacturing method for a touch panel provided by an embodiment of the present disclosure, the first metal layer and the second metal layer are formed to have a metal mesh structure.

According to a specific implementation, in the manufacturing method for a touch panel provided by an embodiment of the present disclosure, the first metal layer and the second metal layer are made of a flexible metal.

According to a specific implementation, in the manufacturing method for a touch panel provided by an embodiment of the present disclosure, the first metal layer and the second metal layer are made of silver or a silver alloy.

BRIEF DESCRIPTION OF DRAWINGS

In order to illustrate the technical solutions in embodiments of the present disclosure more clearly, drawings to be used in depicting embodiments of the present disclosure will be briefly introduced as follows. Apparently, drawings in the depiction below are only some embodiments of the present disclosure. For a person having ordinary skills in the art, other embodiments can also be obtained from these drawings without any inventive efforts.

DETAILED DESCRIPTION OF EMBODIMENTS

In order to render goals, features and advantages of the present disclosure clearer, the present disclosure will be further depicted below in detail with reference to drawings and specific embodiments.

In the following depiction, various devices or components used in embodiments of the present disclosure are indicated by the following reference signs respectively: 01—touch blind zone when using conventional SLOC techniques; 02—touch blind zone in the first metal layer according to an embodiment of the present disclosure; 03—first touch electrode region in the first metal layer; 04—second touch electrode region in the second metal layer; 10—substrate; 11—wiring; 12—bridge point; 13—insulating layer; 14—via hole; 15—driving electrode; and 16—sensing electrode.

Figure 1:
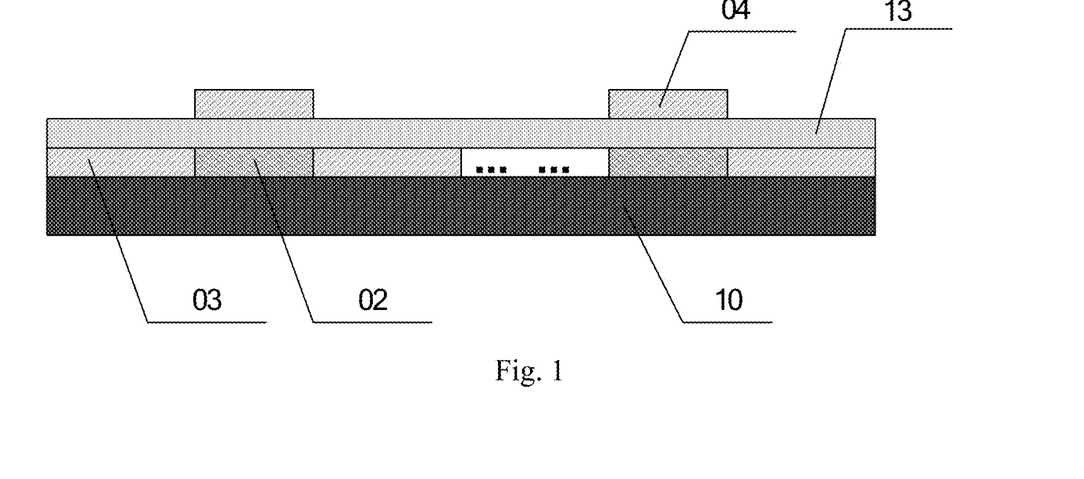
FIG. 1 shows a schematic sectional view of a touch panel according to an embodiment of the present disclosure.

In an embodiment of the present disclosure, a touch panel is provided. Referring to FIG. 1, a schematic sectional view of the touch panel is shown. The touch panel can comprise a substrate 10 and a first, patterned metal layer on the substrate 10. Specifically, the first metal layer comprises a plurality of first touch electrode regions 03 and a plurality of wiring regions 02 between adjacent first touch electrode regions 03, for example, a signal wiring region and a redundant wiring region. Besides, the touch panel can further comprise an insulating layer 13 overlaying the first metal layer and a second metal layer formed on the insulating layer 13. Furthermore, the second metal layer comprises a plurality of second touch electrode regions 04, wherein an orthogonal projection of each second touch electrode region 04 on the substrate 10 overlaps an orthogonal projection of a wiring region (e.g., a signal wiring region or a redundant wiring region) on the substrate 10.

Specifically, the wiring regions, in particular, the signal wiring regions and the redundant wiring regions, form touch blind zones 02 in the first metal layer of the touch panel. Besides, in the expression of "an orthogonal projection of each second touch electrode region 04 on the substrate 10 overlaps an orthogonal projection of a wiring region 02 (e.g., a touch blind zone) on the substrate 10", "overlap[s]" can refer to complete coincidence. In this case, the touch blind zones in the first metal layer will completely achieve a touch control function. Besides, the redundant wirings can also be auxiliary wirings or dummy wirings for example, and functions and arrangements thereof are well known for those skilled in the art.

Figure 2:
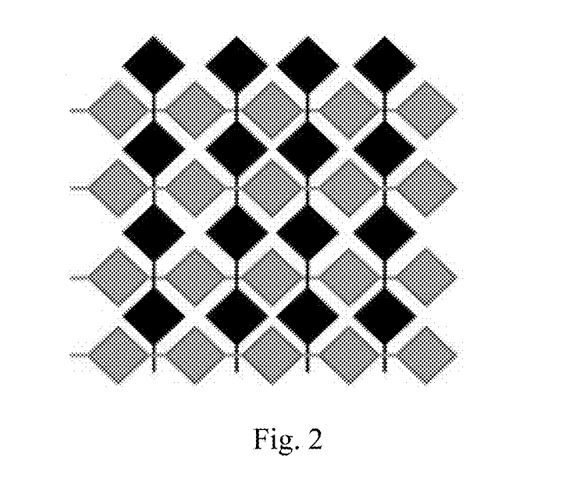
FIG. 2 shows a schematic plan view of a self-capacitive structure in the touch panel according to an embodiment of the present disclosure.

In an embodiment of the present disclosure, the first touch electrode regions in the first metal layer and the second touch electrode regions in the second metal layer can be either self-capacitive structures or mutual-capacitive structures. For example, referring to FIG. 2, a schematic plan view of a self-capacitive structure is shown. For a mutual-capacitive structure, it will be introduced in detail in the subsequent embodiments herein.

In an embodiment of the present disclosure, a touch panel is provided. The touch panel comprises: a first metal layer arranged on a substrate, wherein the first metal layer comprises a plurality of first touch electrode regions and a plurality of wiring regions between adjacent first touch electrode regions; an insulating layer arranged on the first metal layer; and a second metal layer arranged on the insulating layer, wherein the second metal layer comprises a plurality of second touch electrode regions, and an orthogonal projection of each second touch electrode region on the substrate overlaps an orthogonal projection of a wiring region (i.e., a touch blind zone) of the first metal layer on the substrate. In the current solution, by arranging the second touch electrode regions, the touch blind zones on the first metal layer form electrically conductive channels and thereby achieve the touch control function.

Figure 3:
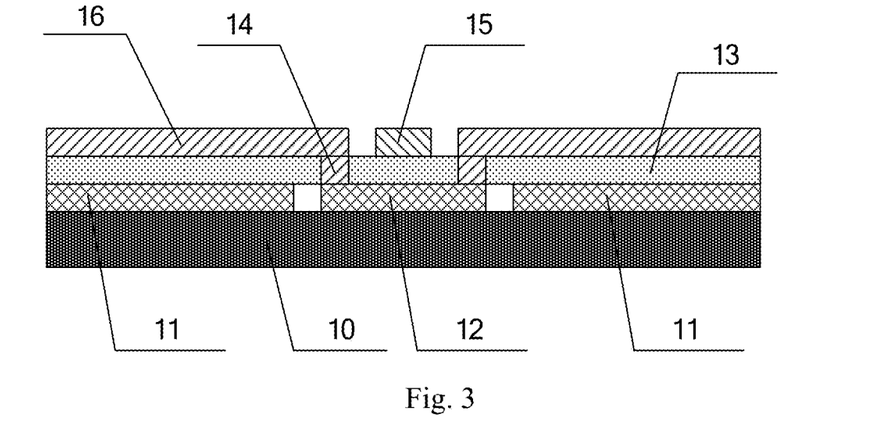
FIG. 3 shows a schematic sectional view of the touch panel according to another embodiment of the present disclosure.

In another embodiment of the present disclosure, a touch panel is further provided. Referring to FIG. 3, a schematic sectional view of the touch panel is shown, and the touch panel can comprise: a substrate 10 and a first metal layer formed on the substrate 10 by a patterning process, wherein the first metal layer comprises a plurality of first touch electrode regions 03 and a plurality of wiring regions 02 between adjacent first touch electrode regions 03, for example, a signal wiring region and a redundant wiring region. Besides, the touch panel further comprises a plurality of bridge points 12 located in gaps between signal wirings 11 in the signal wiring region and/or in gaps between redundant wirings in the redundant wiring region. Correspondingly, the touch panel further comprises: an insulating layer 13 overlaying the first metal layer, wherein the insulating layer 13 is further provided with a plurality of via holes 14 corresponding to the bridge points 12 in position; and a second metal layer formed on the insulating layer 13, wherein the second metal layer comprises a plurality of second touch electrode regions 04, wherein an orthogonal projection of each second touch electrode region 04 on the substrate 10 overlaps an orthogonal projection of a signal wiring region or a redundant wiring region on the substrate 10. Furthermore, the second touch electrode region 04 comprises driving electrodes 15 and sensing electrodes 16 arranged to intersect each other, wherein the driving electrodes 15 or the sensing electrodes 16 are bridged with a bridge point 12 in a corresponding position via a via hole 14 at an intersection.

Figure 4:
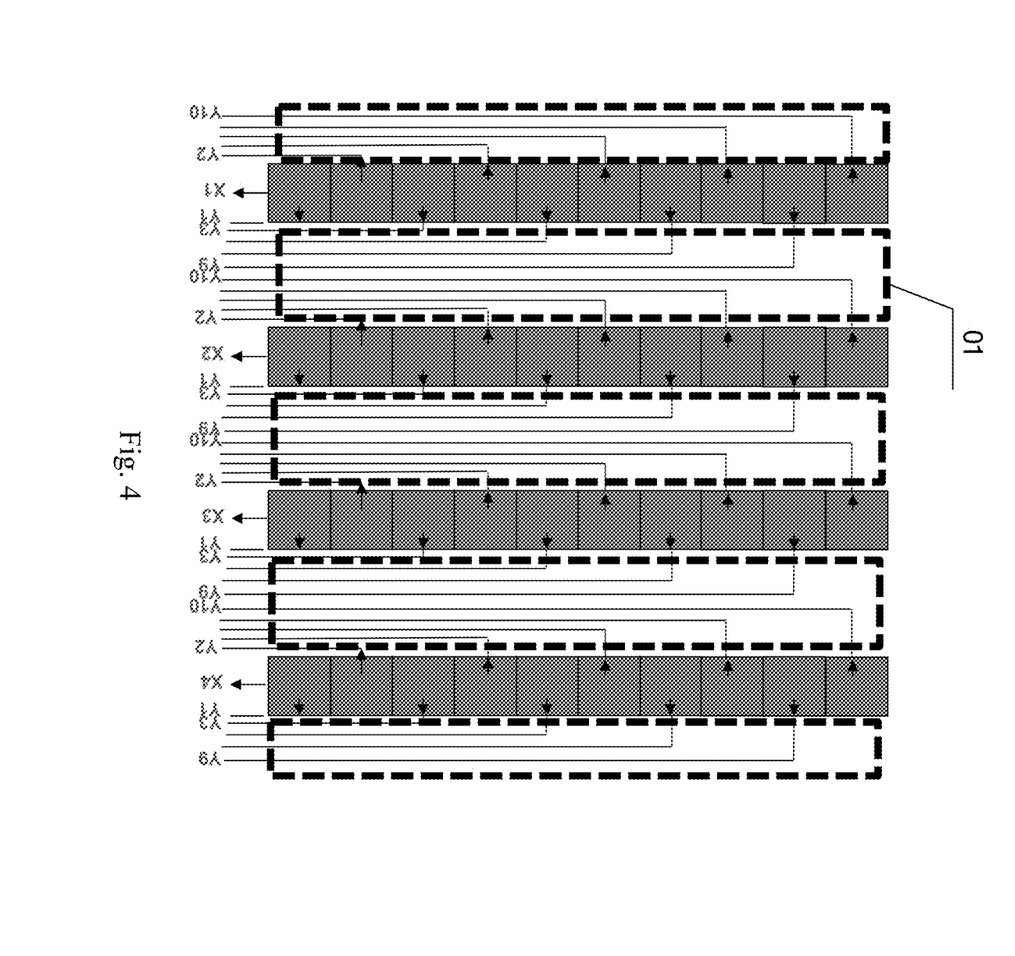
FIG. 4 shows a schematic plan view of a touch panel manufactured by using conventional SLOC techniques.

Specifically, the substrate 10 can be a flexible substrate or a COP ITO film layer. Illustrations are given based on the existing SLOC techniques. Referring to FIG. 4, a schematic structure view of a touch panel manufactured by using conventional SLOC techniques is shown. Furthermore, in FIG. 4, a touch blind zone 01 of a borderless product manufactured by using the existing SLOC techniques is shown by a dashed box.

Figure 5:
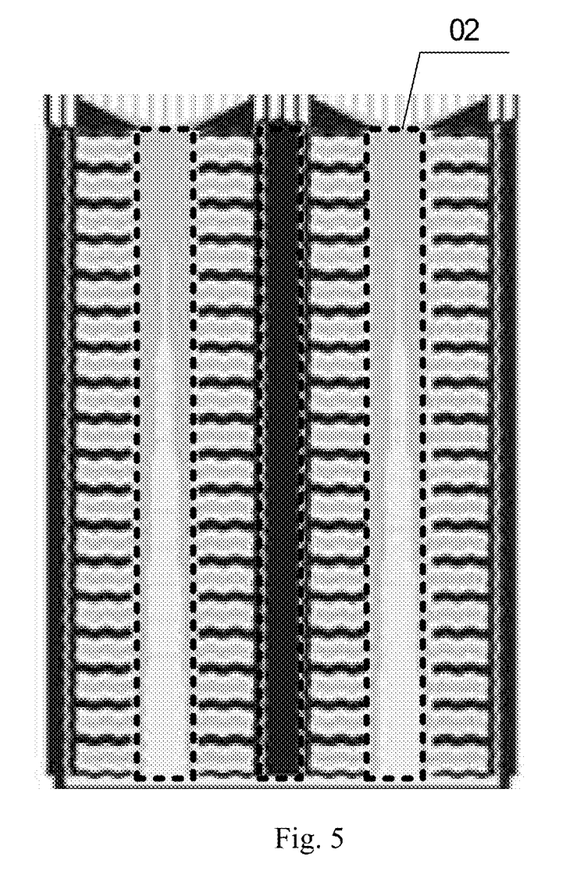
FIG. 5 shows a schematic plan view of a first metal layer in the touch panel according to an embodiment of the present disclosure.
Figure 6:
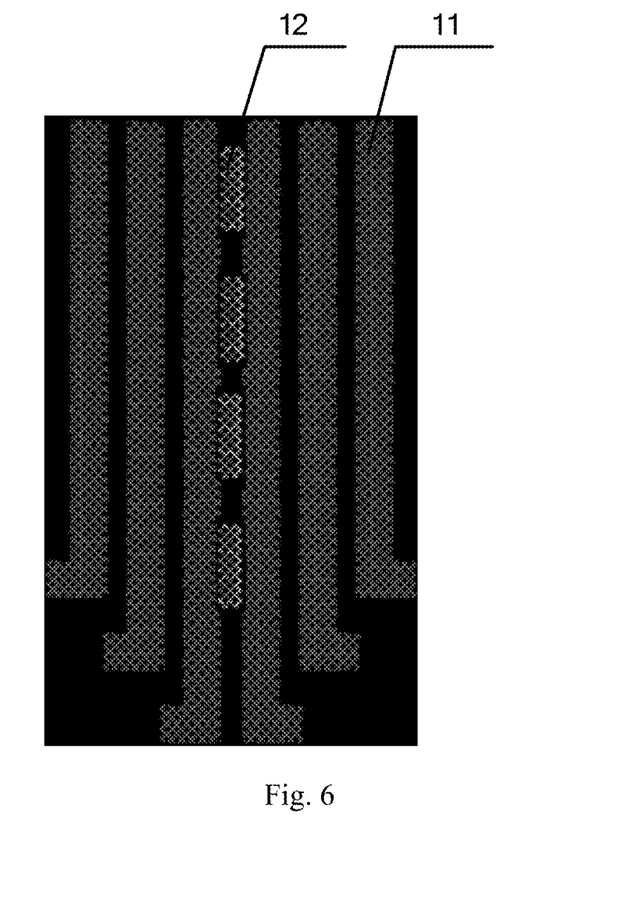
FIG. 6 shows a schematic partial, enlarged plan view of a wiring region of the first metal layer in the touch panel according to an embodiment of the present disclosure.

Referring to FIG. 5 and FIG. 6, a schematic plan view of a first metal layer and a schematic partial, enlarged plan view of a wiring region in the touch panel according to an embodiment of the present disclosure are shown respectively. A first metal layer is manufactured on a substrate 10, the first metal layer comprising first touch electrode regions 03; and wirings, e.g., a signal wiring 11 and a redundant wiring, distributed in a same plane, i.e., in a region between adjacent first touch electrode regions 03, thereby forming a signal wiring region and a redundant wiring region. The signal wiring region and the redundant wiring region form a touch blind zone 02 of the first metal layer, e.g., a region within the dashed box in FIG. 5. In order to achieve a foldable product, the first touch electrode regions 03, the signal wiring region, the redundant wiring region and the bridge points 12 can all have a metal grid structure. In other words, the first metal layer comprises a grid pattern, grid wirings 11, grid dummy wirings and grid bridge points 12. As an example, the grid dummy wirings can be distributed in a region between the grid wirings 11.

In the touch panel structure provided by an embodiment of the present disclosure, the manufacture of bridge points can be accomplished during the formation of first metal layer. As compared with the existing bridging techniques, 1 to 2 optical masks can be saved. For example, the number of masks can be reduced from 4-5 to 3. Thereby, the process complicity and the cost are reduced, thus promoting the product yield.

In order to achieve a visual borderless effect in a true sense that cannot be discriminated by human eyes, the width of grid lines in the first metal layer can be 4-6 µm. For example, the signal wiring 11 and the dummy wiring can have a line width of 4-6 µm.

The first metal layer can be made of a flexible metal, instead of ITO in a conventional solution. In this way, not only can the resistance be reduced, but also the reliability of foldable products can be improved since metals have a better ductility than ITO. For example, the first metal layer can be made of materials such as silver or a silver alloy.

The first metal layer can be entirely overlaid with the insulating layer 13, such that it is insulated from the second metal layer. Meanwhile, via holes 14 are formed in positions corresponding to the bridge points 12. As an example, two via holes 14 formed in positions corresponding to the bridge points 12 are shown in FIG. 3.

Figure 7:
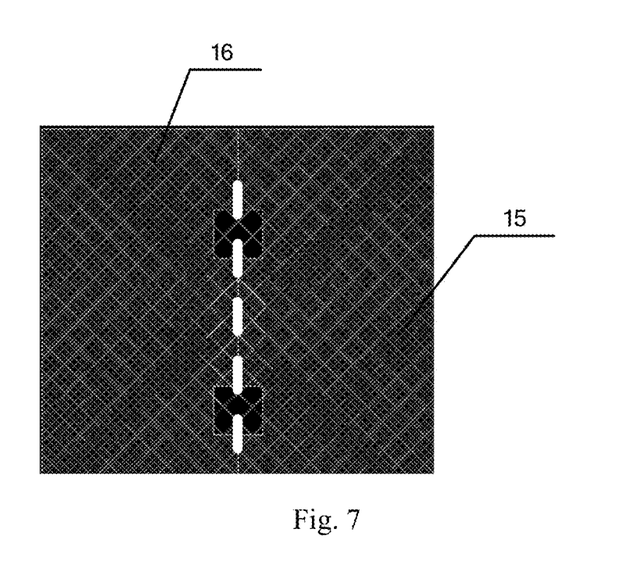
FIG. 7 shows a schematic partial, enlarged plan view of a second metal layer in the touch panel according to an embodiment of the present disclosure.

In order to achieve a foldable product, the second metal layer can also have a metal grid structure. FIG. 3 shows that sensing electrodes 16 are bridged via a bridge point 12 at a via hole 14, wherein driving electrodes 15 and the sensing electrodes 16 are arranged perpendicularly. Referring to FIG. 7, a schematic partial, enlarged plan view of a second metal layer is shown, wherein FIG. 3 corresponds to a sectional view at the dashed position in FIG. 7. Besides, what are bridged via the bridge point 12 can also be the driving electrodes 15, which is not limited in the present application.

The second metal layer can be made of a flexible metal, instead of ITO in the prior art. In this way, not only can the resistance be reduced, but also the reliability of foldable products can be improved since metals have a better ductility than ITO. For example, the second metal layer can be made of materials such as silver or a silver alloy.

In order to achieve a visual borderless effect in a true sense that cannot be discriminated by human eyes, the width of grid lines in the second metal layer can also be 4-6 µm.

In an embodiment of the present disclosure, the driving electrodes 15 or the sensing electrodes 16 on the second metal layer are bridged via the bridge points 12 on the first metal layer, such that the touch blind zones 02 on the first metal layer form electrically conductive channels, thereby achieving the touch control function. Moreover, the bridge points for bridging the second metal layer of the touch panel can be formed simultaneously with the first metal layer. Therefore, as compared with the manufacture process of an existing bridging product, the number of masks can be decreased, thus reducing the process complicity and promoting the product yield.

Figure 8:
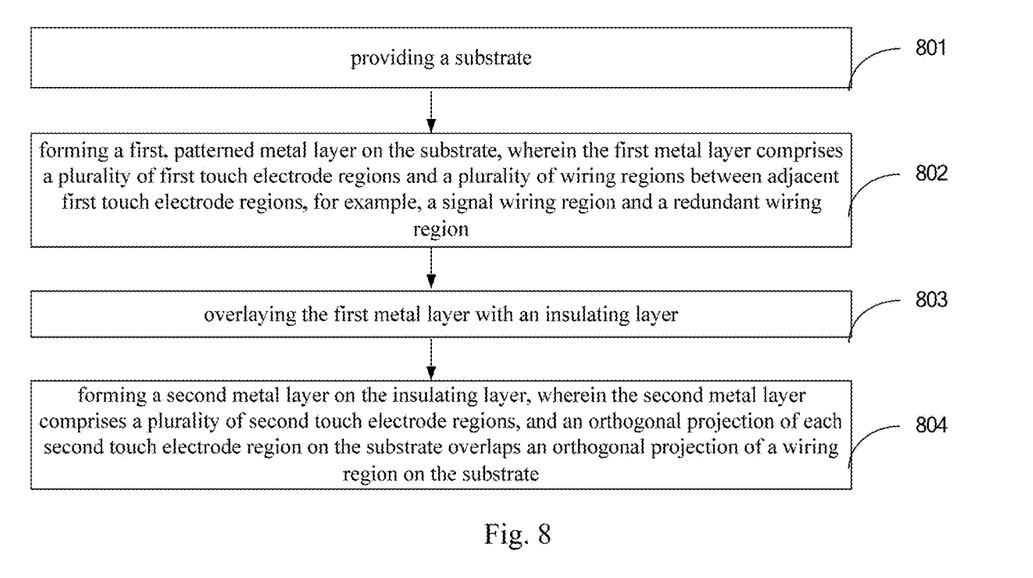
FIG. 8 shows a flow diagram of a manufacturing method for a touch panel according to an embodiment of the present disclosure.

In another embodiment of the present disclosure, a manufacturing method for a touch panel is further provided. Referring to FIG. 8, a flow diagram of a manufacturing method for a touch panel is shown. The manufacturing method can comprise steps as follows.

Step 801, providing a substrate 10.

Specifically, the substrate 10 can be a flexible substrate or a COP ITO film layer.

Step 802, forming a first, patterned metal layer on the substrate 10, wherein the first metal layer comprises a plurality of first touch electrode regions 03 and a plurality of wiring regions 02 located between adjacent first touch electrode regions 03, for example, a signal wiring region and a redundant wiring region.

As an example, the redundant wirings can be auxiliary wirings or dummy wirings, and functions and arrangements thereof are well known for those skilled in the art. The first touch electrode regions in the first metal layer can be either self-capacitive structures or mutual-capacitive structures. The first metal layer can also be formed by using a metal grid structure.

Step 803, overlaying the first metal layer with an insulating layer 13.

Step 804, forming a second metal layer on the insulating layer 13, wherein the second metal layer comprises a plurality of second touch electrode regions 04, and an orthogonal projection of each second touch electrode region 04 on the substrate 10 overlaps an orthogonal projection of a wiring region (e.g., a signal wiring region or a redundant wiring region) on the substrate 10.

As an example, the second touch electrode regions can be either self-capacitive structures or mutual-capacitive structures. The second metal layer can also be formed by using a metal grid structure.

Figure 9:
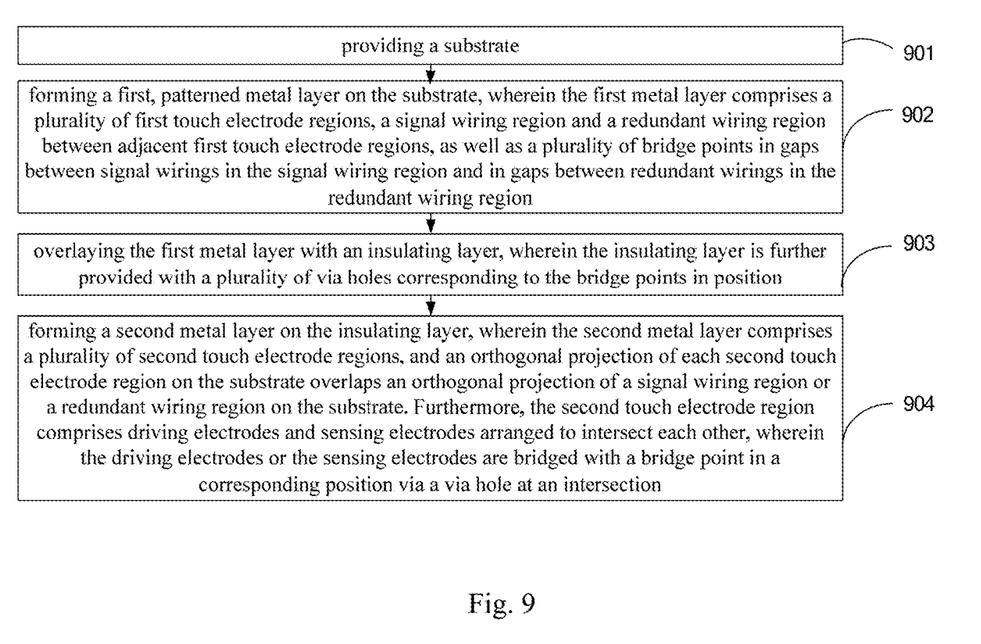
FIG. 9 shows a flow diagram of a manufacturing method for a touch panel according to another embodiment of the present disclosure.

In another embodiment of the present disclosure, a manufacturing method for a touch panel is further provided. Referring to FIG. 9, a flow diagram of another manufacturing method for a touch panel is shown. The manufacturing method can comprise steps as follows.

Step 901, providing a substrate 10.

Step 902, forming a first, patterned metal layer on the substrate 10, wherein the first metal layer comprises a plurality of first touch electrode regions 03 and a plurality of wiring regions 02 located between adjacent first touch electrode regions 03, for example, a signal wiring region and a redundant wiring region. Besides, the first metal layer further comprises a plurality of bridge points 12 located in gaps between signal wirings in the signal wiring region and/or in gaps between redundant wirings in the redundant wiring region.

Specifically, the first metal layer is formed on the substrate 10 by processes such as sputtering evaporation, applying polyresin glue, exposure, developing, etching, stripping and so on. Exemplarily, the first metal layer can have a metal grid structure, comprising grid wirings 11, grid dummy wirings, a grid pattern, grid bridge points 12 and a metal lead for instance. In certain exemplary embodiments, the signal wirings 11 and the dummy wirings can have a line width of 4-6 μm.

In an embodiment of the present disclosure, the manufacture of bridge points 12 can be accomplished during the formation of first metal layer. As compared with the existing bridging techniques, 1 to 2 optical masks can be saved. For example, the number of masks can be reduced from 4-5 to 3. Thereby, the process complicity and the cost are reduced, thus promoting the product yield.

Step 903, overlaying the first metal layer with an insulating layer 13, wherein the insulating layer 13 is further provided with a plurality of via holes 14 corresponding to the bridge points 12 in position.

Specifically, on the first metal layer, an organic insulating layer 13 can be formed by processes such as gumming, exposure, developing and so on, and via holes 14 can be formed in positions corresponding to the bridge points 12. Besides, bonding regions of the touch panel can be further hollowed out in design and processing.

Step 904, forming a second metal layer on the insulating layer 13, wherein the second metal layer comprises a plurality of second touch electrode regions 04, and an orthogonal projection of each second touch electrode region 04 on the substrate 10 overlaps an orthogonal projection of a signal wiring region or a redundant wiring region on the substrate 10. Furthermore, the second touch electrode region 04 comprises driving electrodes 15 and sensing electrodes 16 arranged to intersect each other, wherein the driving electrodes 15 or the sensing electrodes 16 are bridged with a bridge point 12 in a corresponding position via a via hole 14 at an intersection.

Figure 10:
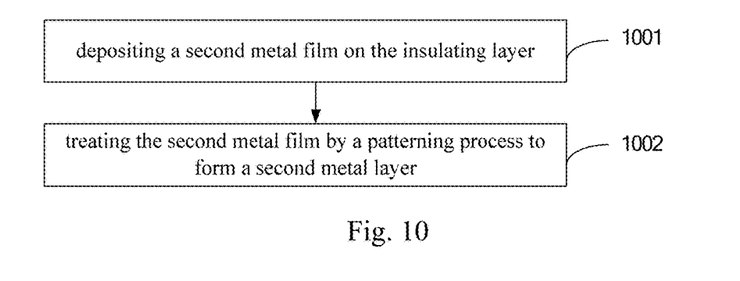
FIG. 10 shows a flow diagram of a manufacturing method for a second metal layer in the touch panel according to an embodiment of the present disclosure.

Referring to FIG. 10, in an embodiment of the present disclosure, the step 904 can further comprise sub-steps as follows.

Step 1001, depositing a second metal film on the insulating layer 13; and

Step 1002, treating the second metal film by a patterning process to form a second metal layer.

Specifically, at a position of the insulating layer 13 corresponding to the signal wiring region and the dummy wiring region of the first metal layer, a second metal layer can be formed by processes such as sputtering evaporation, applying polyresin glue, exposure, developing, etching, stripping and so on. As an example, the second metal layer can have a metal grid structure, comprising an electrically conductive grid pattern for instance. The grid pattern can further comprise driving electrodes 15 and sensing electrodes 16 arranged to intersect each other. As shown in FIG. 3, the sensing electrodes 16 are connected via the bridge points 12 at the via holes 14, which achieves the touch control function in the touch blind zones of the first metal layer.

As an example, the first metal layer and the second metal layer can be made of a flexible metal. In a further exemplary embodiment, the first metal layer and the second metal layer can be made of silver or a silver alloy.

Embodiments of the present disclosure provide a touch panel, a manufacturing method thereof and a corresponding touch device. The touch panel comprises: a substrate; a first metal layer arranged on a substrate, wherein the first metal layer comprises a plurality of first touch electrode regions and a plurality of wiring regions located between adjacent first touch electrode regions, e.g., a signal wiring region and a redundant wiring region; an insulating layer arranged on the first metal layer; and a second metal layer arranged on the insulating layer, wherein the second metal layer comprises a plurality of second touch electrode regions, and an orthogonal projection of each second touch electrode region on the substrate overlaps an orthogonal projection of a wiring region (e.g., the signal wiring region and the redundant wiring region, also referred to as a touch blind zone) of the first metal layer on the substrate. In this way, by introducing the second touch electrode regions, the touch blind zones on the first metal layer form electrically conductive channels and thereby achieve the touch control function.

In this description, each embodiment is described in a progressive manner. Therefore, what each embodiment emphasizes is a difference of the embodiment from others, and for same or similar portions between embodiments, reference can be made to each other.

Finally, it should be noted that relational terms such as "first" and "second" are only used herein for distinguishing one entity or operation from another entity or operation, and they do not necessarily require or imply the presence of any of such actual relations or sequences between the entities or operations. Moreover, terms of "comprise", "include" or any other variant are intended to cover non-exclusive inclusion, such that a process, a method, a commodity or a device comprising a series of elements comprises not only the elements, but also other elements that are not listed explicitly, or alternatively, it further comprises elements that are inherent for the process, the method, the commodity or the device. Without more limitations, an element defined by wordings such as "comprising one" does not exclude the presence of further same elements in the process, the method, the commodity or the device comprising the element.

The touch panel, the manufacturing method thereof and the corresponding touch device provided in embodiments of the present disclosure have been introduced in detail. Principles and implementations of the present disclosure are expounded herein by using specific examples. Explanations of the embodiments are only used for helping to understand the method of the present disclosure and the core concept thereof. Meanwhile, a person having ordinary skills in the art can make various modifications to the specific implementations and application scopes according to the thinking of the present disclosure. To sum up, the content of the description should not be construed as limiting the present disclosure.

The invention claimed is:

1. A touch panel, comprising:
   a substrate;
   a first metal layer on the substrate, wherein the first metal layer is patterned, and comprises a plurality of first touch electrode regions and a plurality of wiring regions between adjacent first touch electrode regions;
   an insulating layer overlaying the first metal layer; and
   a second metal layer on the insulating layer, wherein the second metal layer comprises a plurality of second touch electrode regions, and an orthogonal projection of each second touch electrode region on the substrate overlaps an orthogonal projection of a wiring region on the substrate.

2. The touch panel according to claim 1, wherein
   at least one of the plurality of wiring regions comprises a plurality of wirings and a plurality of bridge points between adjacent wirings;
   the insulating layer comprises a plurality of via holes, an orthogonal projection of each via hole on the substrate overlapping an orthogonal projection of a bridge point on the substrate; and
   each of the second touch electrode regions comprises driving electrodes and sensing electrodes arranged to intersect each other, wherein the driving electrodes or the sensing electrodes are bridged with a corresponding bridge point via one or more via holes at an intersection.

3. The touch panel according to claim 2, wherein the wirings comprise a signal wiring and a redundant wiring.

4. The touch panel according to claim 3, wherein the signal wiring and the redundant wiring have a line width of 4-6 µm.

5. The touch panel according to claim 1, wherein the first metal layer and the second metal layer have a metal mesh structure.

6. The touch panel according to claim 1, wherein the first metal layer and the second metal layer are made of a flexible metal.

7. The touch panel according to claim 1, wherein the first metal layer and the second metal layer are made of silver or a silver alloy.

8. A touch device, comprising the touch panel according to claim 1.

9. A manufacturing method for a touch panel, comprising:
   providing a substrate;
   forming a first metal layer on the substrate, wherein the first metal layer is patterned, and comprises a plurality of first touch electrode regions and a plurality of wiring regions between adjacent first touch electrode regions;
   overlaying the first metal layer with an insulating layer; and
   forming a second metal layer on the insulating layer, wherein the second metal layer comprises a plurality of second touch electrode regions, and an orthogonal projection of each second touch electrode region on the substrate overlaps an orthogonal projection of a wiring region on the substrate.

10. The manufacturing method according to claim 9, further comprising:
    forming a plurality of wirings and a plurality of bridge points between adjacent wirings in at least one of the plurality of wiring regions;
    forming a plurality of via holes in the insulating layer, such that an orthogonal projection of each via hole on the substrate overlaps an orthogonal projection of a bridge point on the substrate; and
    forming driving electrodes and sensing electrodes to intersect each other in each of the second touch electrode regions, such that the driving electrodes or the sensing electrodes are bridged with a corresponding bridge point via one or more via holes at an intersection.

11. The manufacturing method according to claim 10, wherein
    the wirings comprise a signal wiring and a redundant wiring, and
    the signal wiring and the redundant wiring have a line width of 4-6 µm.

12. The manufacturing method according to claim 9, wherein forming a second metal layer on the insulating layer comprises:
    depositing a second metal film on the insulating layer; and
    treating the second metal film by a patterning process to form a second metal layer.

13. The manufacturing method according to claim 9, wherein
    the first metal layer and the second metal layer have a metal mesh structure.

14. The manufacturing method according to claim 9, wherein
    the first metal layer and the second metal layer are made of a flexible metal.

15. The manufacturing method according to claim 9, wherein
    the first metal layer and the second metal layer are made of silver or a silver alloy.

16. The touch device according to claim 8, wherein
    at least one of the plurality of wiring regions comprises a plurality of wirings and a plurality of bridge points between adjacent wirings;
    the insulating layer comprises a plurality of via holes, an orthogonal projection of each via hole on the substrate overlapping an orthogonal projection of a bridge point on the substrate; and
    each of the second touch electrode regions comprises driving electrodes and sensing electrodes arranged to intersect each other, wherein the driving electrodes or the sensing electrodes are bridged with a corresponding bridge point via one or more via holes at an intersection.

17. The touch device according to claim 16, wherein the wirings comprise a signal wiring and a redundant wiring.

18. The touch device according to claim 8, wherein the first metal layer and the second metal layer have a metal mesh structure.

19. The touch device according to claim 8, wherein the first metal layer and the second metal layer are made of a flexible metal.

20. The touch device according to claim 8, wherein the first metal layer and the second metal layer are made of silver or a silver alloy.

* * * * *